Dec. 16, 1952           A. W. FRANKLIN           2,622,054

METHOD OF MAKING AN ELECTRICAL UNIT

Original Filed May 11, 1946           6 Sheets-Sheet 1

INVENTOR
Albert W. Franklin
BY Darby & Darby
ATTORNEYS.

Dec. 16, 1952  A. W. FRANKLIN  2,622,054
METHOD OF MAKING AN ELECTRICAL UNIT
Original Filed May 11, 1946  6 Sheets-Sheet 2

INVENTOR
Albert W. Franklin
BY
Darby & Darby
ATTORNEYS.

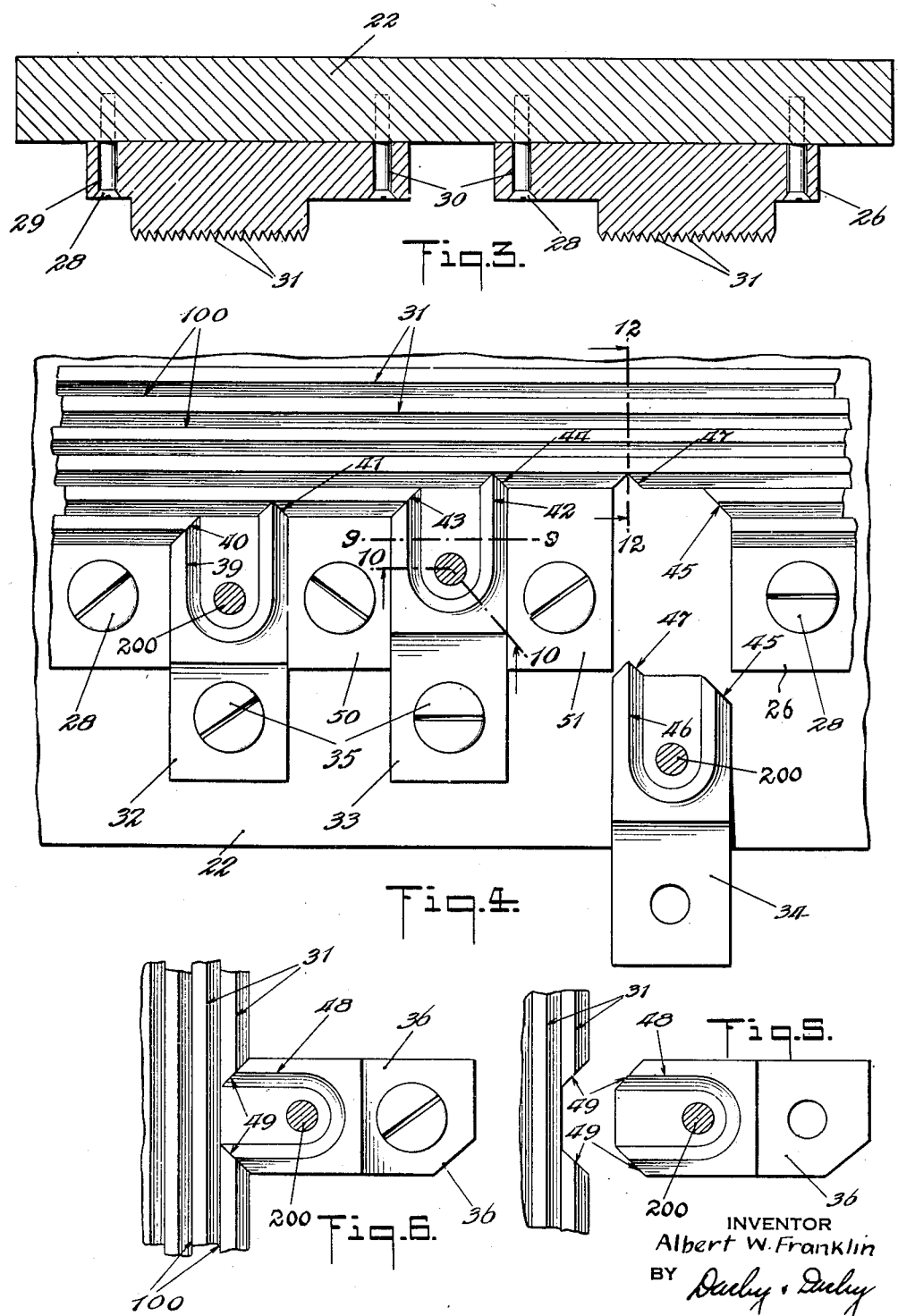

Dec. 16, 1952     A. W. FRANKLIN     2,622,054
METHOD OF MAKING AN ELECTRICAL UNIT
Original Filed May 11, 1946     6 Sheets-Sheet 4

INVENTOR
Albert W. Franklin
BY Darby & Darby
ATTORNEYS

Dec. 16, 1952 A. W. FRANKLIN 2,622,054
METHOD OF MAKING AN ELECTRICAL UNIT
Original Filed May 11, 1946 6 Sheets-Sheet 5

INVENTOR
Albert W. Franklin
BY
Darby + Darby
ATTORNEYS

Dec. 16, 1952        A. W. FRANKLIN        2,622,054

METHOD OF MAKING AN ELECTRICAL UNIT

Original Filed May 11, 1946        6 Sheets-Sheet 6

INVENTOR.
Albert W Franklin.
BY
Darby & Darby
Att'ys.

Patented Dec. 16, 1952

2,622,054

UNITED STATES PATENT OFFICE 2,622,054

METHOD OF MAKING AN ELECTRICAL UNIT

Albert W. Franklin, Mount Vernon, N. Y.

Original application May 11, 1946, Serial No. 699,197, now Patent No. 2,535,674, dated December 26, 1950. Divided and this application October 31, 1950, Serial No. 193,057

1 Claim. (Cl. 154—125)

This invention relates to an improved method of manufacturing electrical units wherein a sheet of conducting foil such as copper is simultaneously sheared to form a predetermined circuit design and attached to an insulating support.

Another object is to effect such attachment by conductively heating the design while simultaneously shearing it from the foil sheet to attach the design to the insulating support by means of an adhesive.

In the accompanying drawings,

Figure 3 is a transverse, central, cross-sectional view through the die of Figure 2;

Figure 4 is an enlarged detailed plan view of a portion of the die showing the structural features by means of which the primary terminal tabs and one of the secondary terminal tabs is formed;

Figure 5 is a plan view disassembled and Figure 6 is a plan view assembled of the portion of the die by means of which one of the intermediate secondary terminals or the final secondary terminal is formed;

Figure 8:
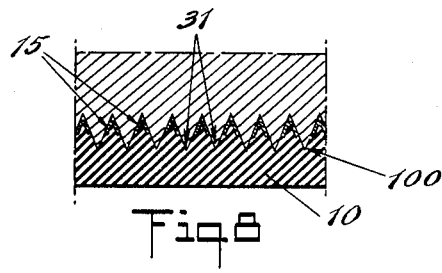
Figure 8 is a similar view showing the relationship of the parts at the end of the cutting, forming and attaching operation of the die.
Figure 10:
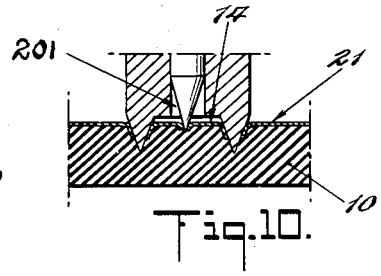
Figure 12:
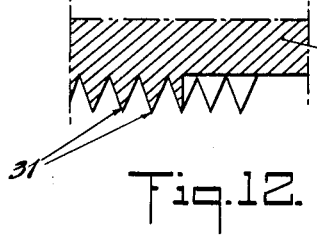
Figure 11:
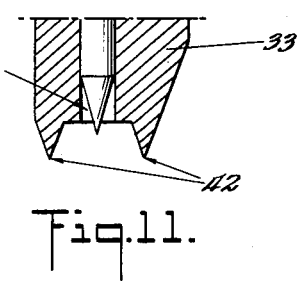
Figures 13, 14:
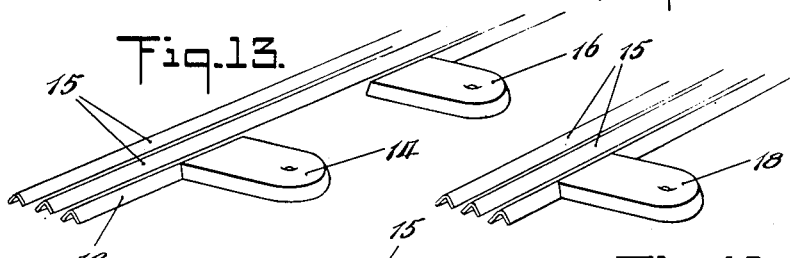
Figure 15:
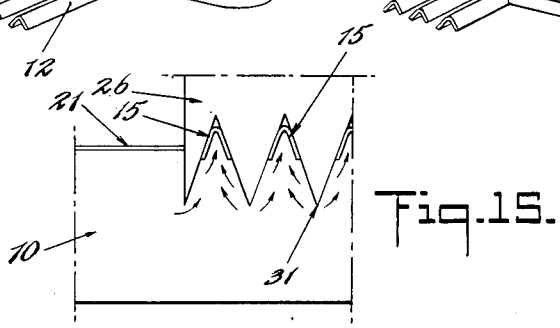
Figure 16:
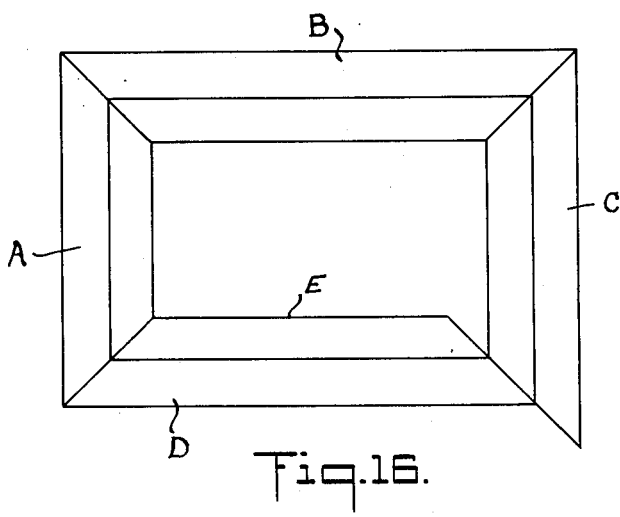
Figure 17:
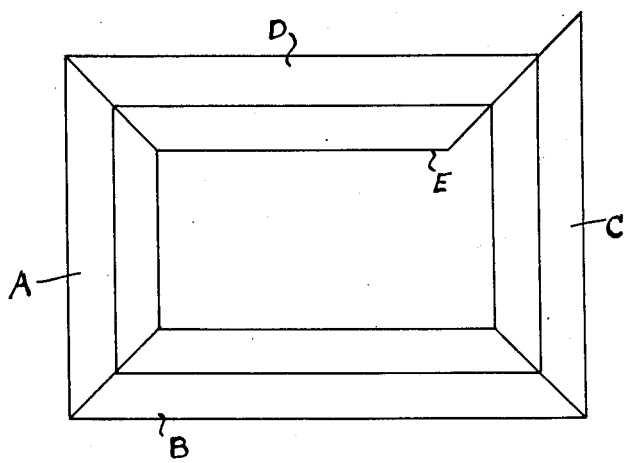
Figure 18:
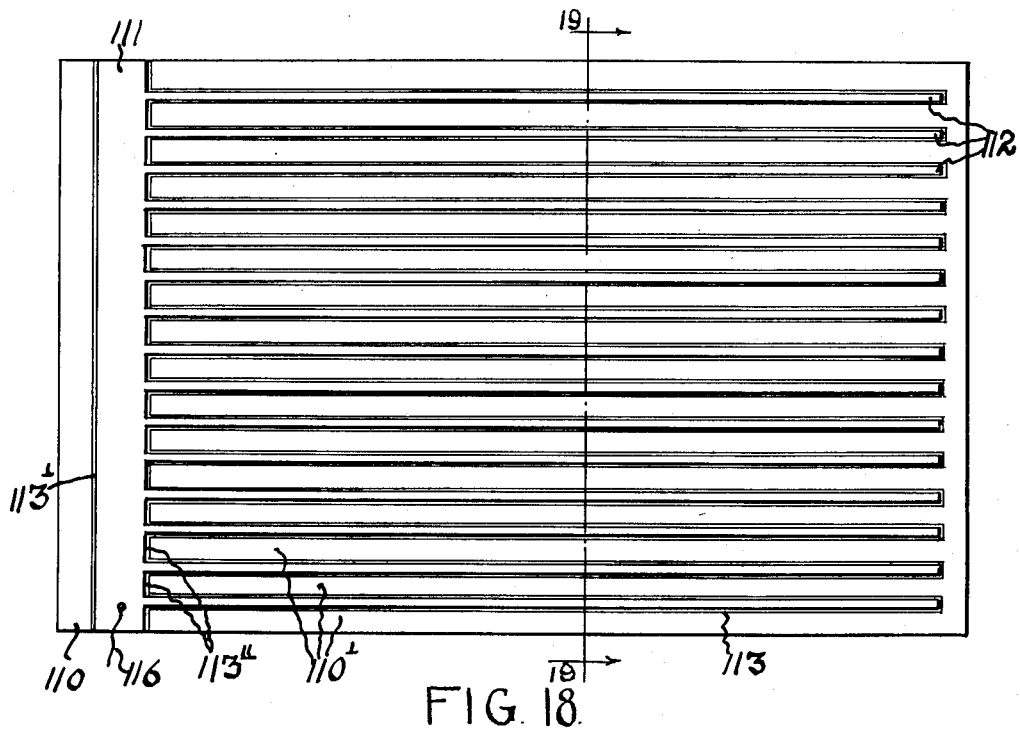
Figure 19:
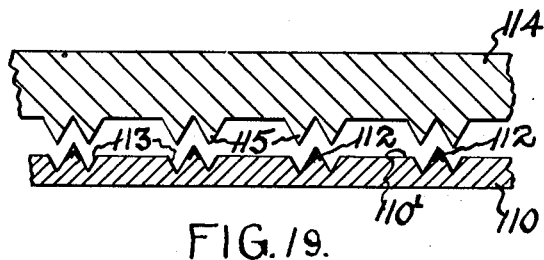

Figure 10 corresponds to Figure 8 and shows the relationship of these parts at the end of the cutting, forming and attaching operation of the die;

Figure 11 is a cross-sectional view taken on the line 11—11 of Figure 4;

Figure 12 is a cross-sectional view taken on the line 12—12 of Figure 4;

Figure 13 is a perspective view of several of the conductors and a pair of terminal tabs;

Figure 14 is a similar perspective view showing one of the intermediate tabs;

Figure 15 is a diagrammatic view illustrating something of the action which occurs during cutting, forming and attaching of the conductors to the insulating supports;

Figures 16 and 17 are simple, diagrammatic views illustrating how the multi-part die can be assembled to form windings of reverse rotation;

Figure 18 is a plan view of an electrostatic shield constructed in accordance with the principles of this invention; and Figure 19 is an enlarged cross-sectional view of a portion of the structure of Figure 18 taken on the line 19—19 of Figure 18.

Briefly, the object of this invention is to provide novel and improved forms of electrical units such as inductances, electrostatic shields, circuit wiring, and the like attached to an insulating support and formed by a simple stamping operation from a sheet of metal foil. The metal foil is superimposed upon the insulating support either with or without the interposition of an adhesive. By means of a die in a single operation the sheet of metal foil is cut along shear lines without waste to form the sheet into conductors of channel formation and attach them to the insulating support. The adhesive may be any adhesive suitable for the purpose and generally may be either of the thermosetting or thermoplastic type. It may be applied to either or both of the adjoining faces of the insulating support and the metal foil in any suitable manner, or may be interposed therebetween in the form of a thin sheet of material as a separate element. A thermoplastic form of adhesive is preferred, and the die, by means of which the metal foil is cut, is preferably heated to such a temperature that simultaneously with the cutting of the metal sheet and forming of the electrical unit therefrom the adhesive is softened, aiding in attaching the resulting channel-shaped conductors of the unit to the insulating support. In some forms of the device, it is not necessary to use an adhesive, since the clamping and clinching action resulting from the formation of the cut strips into channel cross-section results in a sufficiently strong connection between the two.

Figure 1:
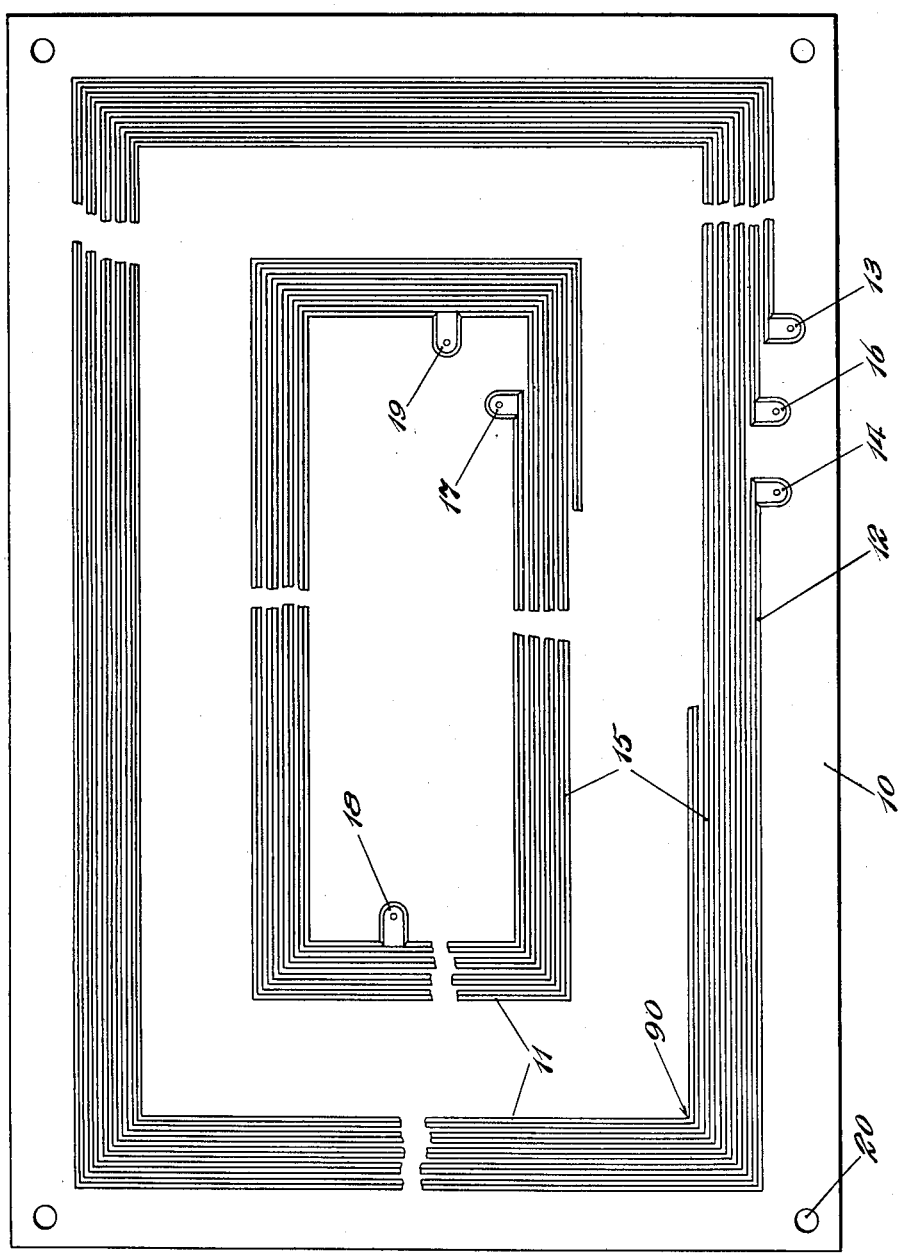
Figure 1 is a plan view with some portions broken away and others omitted of an inductance specifically a loop antenna embodying the features of this invention.

One highly useful form of structure, employing the feature of this invention, is illustrated in Figure 1, in the form of a two-winding inductance suitable for use as a loop antenna in radio receiving sets. The insulating support 10 may be of any suitable configuration, but for use with radio receiving sets may be of such size and configuration as to form the back for the receiving set cabinet. This support can be of any suitable material, as for example fiberboard, of which "Masonite" is an example, and various so-called plastic materials of which "Bakelite" is an example.

The convolutions of the inductance consist of metal conductors of channel-shaped formation, for example V-shaped cross-section, as is clear from such figures as 8 and 13. As illustrated, the inductance comprises a single turn primary 12 having the terminal tabs 13 and 14 to which terminal connections can be made, by means of terminal loops, binding posts, soldered connections, and the like. The secondary 15 consists of a plurality of regularly related convolutions 11 composed of a single channel-shaped conductor, which for convenience can be said to begin at the terminal tab 16 and terminate at the terminal tab 17. To insure clarity, it may be noted that a number of the intermediate convolutions of the secondary 15 have been omitted. To illustrate the point, near the inner end of the secondary 15 are additional terminal tabs 18 and 19 which may or may not be used in a commercial structure, as conditions dictate. For purposes of adjustment, these additional tabs may be desirable in order to provide for variation in the secondary inductance in the final adjustment. An important characteristic of the structure resides in the fact that each convolution is generally of rectangular form in that the conductors for any adjacent pair of sides of a convolution meet at a right angle, as indicated at 90 in Figure 1. As will be clear, as the description proceeds, the conductor is continuous, but is so formed that the turns are of rectangular form, varying therefrom only in the amount of the pitch of the convolutions. The apertures indicated at 20 are provided to receive screws or other attaching means for fastening the unit in the back of the cabinet, for the purpose of completing the cabinet and mounting the antenna therein.

A description of the die by means of which the structure of Figure 1 can be formed now follows. It consists of a base plate 22 to which the parts comprising the die are attached. The die proper, indicated by the reference numeral 23, consists of four parts, 25, 26, 27 and 29, which are attached in assembled relation to the plate 22 by means of screws 28. The cutting portion of the die parts is raised above the remainder, as is clear from Figure 3, providing an outer flange and a wider inner flange 30 in which flanges screw receiving apertures are provided. The raised portion of each die part is provided with a series of straight channels of V-cross-section, providing continuous straight cutting edges 31. The ends of the die parts are cut on a 45 degree angle so that these parts can be assembled in rectangular relation, as clearly shown in Figure 2.

A very important feature of construction of these die parts is that each pair of opposite sections are of different length with respect to each other. Thus the section 27 is shorter than the section 25 and the section 29 is shorter than the section 26. The difference in length of these sections is equal to the pitch of the convolutions defining the cutting edge 31. This cutting edge for the primary 12 is continuous and the cutting edge for the secondary 15 is continuous, but between these two cutting edges there is an interruption. It is by reason of this structural feature, namely the difference in length between the corresponding parts of each pair that it is possible to cut a single sheet of metal foil, as will be still further explained below, in one operation into a single continuous conductor in the form of a plurality of convolutions, or in the case illustrated, into two such conductors. The difference in length of the parts of each pair is equal to the pitch of the convolutions, as previously mentioned.

This principle is rather clearly illustrated in Figures 16 and 17, as well as the principle of the formation of convolutions of either direction of rotation. The cutting edge C is diagrammatically illustrated in these figures for convolutions of rather large pitch, wherein the effects of forming the die of parts of different length becomes apparent. As illustrated in Figures 16 and 17, the die is composed of the parts A, B, C and D. The part C is of a length greater than the corresponding part A by an amount equal to the pitch of the convolutions and the same is true of the part B with relation to the part D. With these parts assembled as shown in Figure 16, a formation of clockwise rotation results. By reversing the parts, as shown in Figure 17, the same parts can be employed to cut a formation of counterclockwise rotation.

Figure 2:
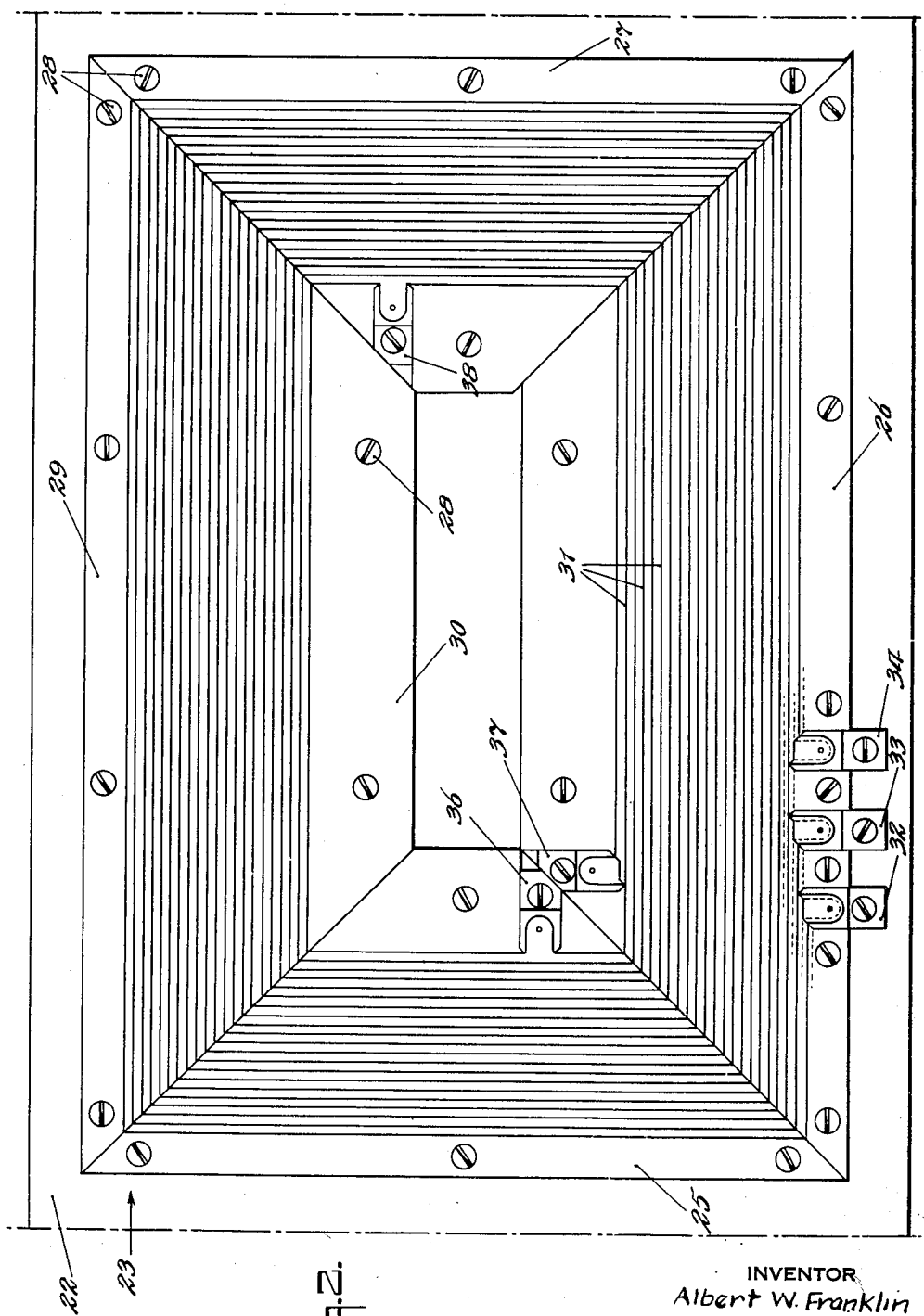
Figure 2 is a plan view of the die by means of which the loop antenna of Figure 1 may be made.

As clearly illustrated in Figure 2, the cutting edges meet at right angles, resulting in the formation of rectangular convolutions, as previously explained.

Portions of the die parts are cut away to permit the addition of inserts by means of which integral tabs may be simultaneously cut and formed, at the time of the cutting and formation of the conductor. Thus, in Figures 1, 4, 5 and 6, it will be seen that the die parts are cut away to provide several inserts of proper configuration. These inserts are illustrated at 32, 33, 34, 36, 37 and 38 and are attached to the base plate 22 by means of screws such as the screws 35 (see Fig. 4). The insert 32 is provided with a triangular ridge forming the U-shaped cutting edge 39, and the ends of the insert are tapered, as are the corresponding portions of the main die parts 26, so that these parts meet on the diagonals 40 and 41. This brings the cutting edge 39 into right angle relation with the cutting edges 31 and together they form a continuous cutting edge. The insert 33 is of quite similar form and joins the main die along the diagonal faces 43 and 44. The main die is cut out at 41 and 44, as indicated at 47 with regard to the insert 34, which meets the main die part on the diagonals 45 and 47 as before. Upon comparison, it will be seen that the inserts 32 and 34 are quite similar but are reversed in form. The spaces between these dies are filled by plain inserts 50 and 51 to provide a structure which appears as shown at this region in Figure 2. The insert 37 is similar in construction and arrangement to either of the inserts 32 and 34. The inserts 36 and 38 are illustrated in Figures 5 and 6. The main die is cut away so that the insert can meet on the diagonals 49, bringing the cutting edge 48 and the insert into right angle relation, and in effect making the cutting edge 48 a continuation of the cutting edges 31. At this point it may be noted that the reference numeral 100 represents the base of the V-shaped channel to aid in distinguishing the cutting edges 31. Each of the inserts is provided with a punch 200 operating in apertures 201 in the inserts. These punches serve to provide small apertures in the tabs into which binding posts or clips may be riveted or otherwise attached. It may also be noted in passing that Figure 12 may be helpful in understanding the construction of the die at the point of mounting of one of the inserts.

Figure 7:
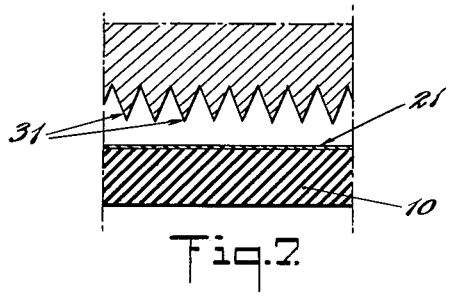
Figure 7 is a cross-sectional view through a portion of the die, the insulating support and the metal foil mounted thereon, showing the relation of these parts just prior to the cutting operation of the die.

The die unit comprising the base 22 and the die proper 23 (see Fig. 2) is mounted in a press or other suitable machine for effecting reciprocation. When adhesives requiring heat are employed, the die can be heated in any suitable and well known manner. An insulating support 10 is placed on the bed of the die and a metal foil of the proper shape or the end from a roll of metal foil is superposed thereon, as indicated in Figure 7. As previously mentioned, if an adhesive is used, it will lie between the support 10 and the foil 21, and may be applied directly to either or both by a coating or by the insertion of a thin separate unit of adhesive, as for example a thin sheet of thermoplastic adhesive. The parts are then below the die, as is clear from Figure 7, and when the die comes down the cutting edges 31 shear the metal foil 21 along lines corresponding to the cutting edges 31, and as the die is driven home these metal strips are deformed into sharply peaked V-shaped channels comprising the conductors 15, as illustrated in Figure 8.

Referring to Figure 15, it will be seen that as the triangular shaped cutting members are forced into the material of the support 10 under pressure, the material will tend to flow upwardly, as indicated by the arrows, and be compressed and condensed behind the conductors 15, and as a matter of fact, forced a short distance above the plane of the top of the support 10. The metal conductor strips and the material and supporting base are brought into intimate contact under considerable pressure which tends to bind them together and when an adhesive is used the heated die softens it insuring still greater adhesion therebetween. At this point it may be noted, adhesives which do not require heat may be employed within the purview of this invention. The entry of the triangular shaped cutters into the material of the base between the strips forms, as will be clear, an air space between them so that the final product consists of an inductance or conductors which are separated by an air space.

An important structural feature is illustrated in Figure 15 as comprising the relative location of parts wherein the conductors 15 have their apices in a plane which is above the initial plane of the supporting base 10, while their lower edges are below that plane. This results in the advantage that it is not possible to easily get an object under the edges of the conductors and thus force them loose. This contributes to a structure which will stand normal handling without fear of breaking the conductors loose from the supporting base.

Figure 9:
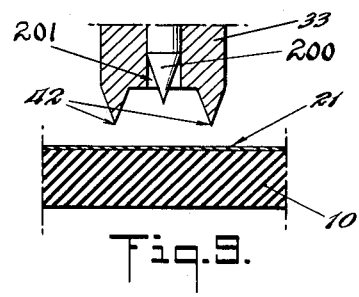
Figure 9 is a cross-sectional view through one of the tab forming portions of the die taken on the line 9—9 of Figure 4, showing the relationship of the parts at the same operating stage as illustrated in Figure 7.

Figures 9 and 10 illustrate rather clearly how the tabs are likewise sheared out of the sheet and attached to the base. In practice the foil sheet 21 in outer dimensions will be slightly larger than the inductance to be formed so that there will be a slight amount of foil waste representing the original configuration of the sheet which is stripped off from the base. This waste is not adhesively bound to the supporting base even in the case where an adhesive is used. Likewise the center portion of the sheet which remains undisturbed is stripped out to form the final structure shown in Figure 1. If binding posts are riveted through the apertures formed by the punches 200 the attachment of the tabs to the supporting base is further insured.

Upon consideration it will be seen that the planar width of the conductor which is formed into channel shape is equal to the pitch of the convolutions forming the article. This is one way of stating that there is no waste material formed between the convolutions, eliminating any stripping operation and resulting in the desirable requirement that the conductors have a maximum conducting cross-section available. Simultaneously the air space between turns results in providing an all air dielectric inductance between the adjacent surfaces of the conductors.

From the above description it will be seen how a spiral of rectangular formation results and why the adjacent sides of each convolution meet at right angles.

The advantage of this die construction will also be well understood when it is realized that by removing the die parts 25, 26, 27 and 29 from the plate 12, they may be readily sharpened by a suitably shaped abrasive wheel. The abrasive wheel can enter the V-shaped grooves and travel continuously from end to end. All cutting edges are straight so that the die parts can easily be sharpened in available grinding machines.

An electrostatic shield constructed in accordance with the subject matter of this invention is illustrated in Figures 18 and 19. In this case the supporting base, similar to the base 10, is illustrated at 110. A sheet of metal foil is placed thereon and a die, which is much simpler in this case, is employed to cut, form and attach the conductors comprising the shield. The shield consists of a transverse conductor 111 from which radiate laterally a series of parallel conductors 112 of triangular cross-section. A portion of the die for this construction is illustrated at 114. The triangular shaped ridges 115 provide the straight cutting edges by means of which the conductors 112 are formed. However, in this case each conductor is formed by a pair of cutting edges which are spaced a distance representing the spacing between the finished conductors 112. These cutting edges form triangular grooves in the supporting base 110, as illustrated at 113. As before, the parts are preferably arranged so that the lower edges of the conductors 112 are below the plane of the base 110 while their apices are above the plane. Adjacent pairs of cutting edges are joined to cut the metal and groove the base, as indicated at 113", at the ends where the conductors 112 are attached to the transverse conductor 111.

A single transverse cutting edge is provided on the die to shear the sheet and groove the base along the line 113'. Thus an electrostatic shield attached to a supporting base, all as illustrated in Figure 18, is formed from a single sheet of foil. There will be a strip along the lefthand edge comprising waste, as well as a grid comprising the strips between the conductors 112 and the conducting strip along the righthand edge which will likewise be removed as waste. When a thermosetting adhesive is employed as previously mentioned, the die 114 will be heated but the areas between the cuting edges will be sufficiently relieved so that they do not contact the metal foil in the areas between the conductors, thus facilitating stripping of the waste from between the conductors.

It now follows from the previous description how other electrical conducting configurations can be constructed in accordance with the principles of this invention, as for example circuit wiring configurations. By employing means of this invention, it will be seen that a series of parallel conductors can be formed with a minimum of spacing attainable when cutting them from a single sheet of metal. By constructing the die of the proper formation various circuit combinations can be simultaneously formed from a single sheet of metal and attached to a supporting base. It is contemplated that within the principles of this invention the circuit wiring for electrical apparatus can thus be simply and inexpensively formed.

In all forms of structure made in accordance with this invention, it is preferable to shape the die so as to form V-shaped conductors having an acute angle. Especially when these conductors are used for the transmission of high frequency alternating currents they will be found entirely suitable in view of the well known facts that such currents travel on the surface of the conductor. A hollow V-shaped conductor makes it possible to get the maximum number of parallel conductors in a given space while obtaining the maximum surface area and dielectric insulating space between them. The electrostatic field between the conductors is mainly through the air and only a small portion of the electrostatic field will pass through the dielectric material of the supporting base, thus reducing the dielectric losses to a minimum.

Another advantage of this form of conductor in the combination disclosed is the mechanical advantage of the clinching and gripping action which a sharply angled V-shaped conductor provides. The sharply angled conductor, as previously explained, grips the raised material of the insulating base, aiding in the mechanical attachment of the conductor to the base. In the electrostatic shield of the type disclosed which is normally placed close to the loop antenna, the V-shaped form of conductor allows maximum spacing for the radio signals to get through while exposing less metal to the external field of the loop, thereby reducing eddy current losses in the shield.

It should also be noted that the turns comprising the primary and secondary of a two coil inductance may be more widely spaced than is illustrated in this figure. If the turns of the primary are to be spaced in the turns of the secondary the die will be so formed that metal can be stripped between the innermost portion of the primary and the outermost portion of the secondary to give any desired spacing therebetween. This can be accomplished by modifying the die at the region in accordance with the principle illustrated in Figure 19, so that a strip of metal of the desired width will be formed which can be stripped out.

This application is a division of my copending application Serial No. 669,197, filed May 11, 1946, now Patent No. 2,535,674, for Electrical Unit and Method of Making Same.

From the above description it will be apparent to those skilled in the art that the subject matter of this invention is capable of considerable variation, and I do not, therefore, desire to be limited to the illustrated embodiments herein set forth. I prefer to be limited only as required by the appended claim.

What is claimed is:

A method of manufacturing an electrical circuit component comprising in a single operation the simultaneous cutting and attaching by adherence, of a predetermined circuit design onto an insulating support which flows at the temperatures and pressures employed, from a sheet of metal coated on the side facing said support with a thermo-responsive adhesive.

ALBERT W. FRANKLIN.

REFERENCES CITED

The following references are of record in the file of this patent:

UNITED STATES PATENTS

| Number | Name | Date |
|---|---|---|
| 1,788,260 | Warth | Jan. 6, 1931 |
| 2,288,735 | O'Connell | July 7, 1942 |
| 2,321,740 | Flint | June 15, 1943 |
| 2,401,472 | Franklin | June 4, 1946 |

FOREIGN PATENTS

| Number | Country | Date |
|---|---|---|
| 283,085 | Great Britain | Jan. 5, 1928 |